Nov. 26, 1968  W. R. WOOD  3,412,446
ROLL CONSTRUCTION
Filed Aug. 24, 1966

INVENTOR.
W. R. WOOD

United States Patent Office 3,412,446
Patented Nov. 26, 1968

3,412,446
ROLL CONSTRUCTION
William Robert Wood, Ottumwa, Iowa, assignor to Deere & Company, Moline, Ill., a corporation of Delaware
Filed Aug. 24, 1966, Ser. No. 574,592
3 Claims. (Cl. 29—121)

ABSTRACT OF THE DISCLOSURE

A pull-type hay conditioner having a pair of cooperating and meshing fluted rolls, the crop being picked up by the lower roll as the machine advances, passing rearwardly between the rolls, and being crimped thereby. The rolls are identical and are fabricated by welding a pair of semi-cylindrical longitudinally corrugated outer members to an elongated tubular core having the same radius as the concave side of the outer members, the members conjunctively encircling the core.

---

This invention relates to an improved construction of a crimping roll for use in agricultural machinery such as a crop conditioner or the like.

A typical crop conditioner includes a pair of transverse rolls between which a previously harvested crop, such as hay, is passed to crack or crush the crop stems in order to accelerate the curing of the crop. Several types or combinations of rolls are utilized in such crop conditioners. For example, some conditioners utilize a pair of fluted rolls to crimp the crop stems, while other conditioners utilize a single fluted roll in combination with a relatively smooth roll, usually made of elastomeric material, while still other conditioners utilize a pair of smooth rolls.

The present invention relates to the construction of only the fluted type roll, which preferably meshes with a similar fluted roll to crimp the hay or like material as it passes between the rolls.

Such rolls have previously been made by coaxially assembling cast roll sections, or by machining the longitudinal ribs or flutes in a cylinder, or by individually welding or otherwise fastening longitudinally extending ribs to the outer periphery of the cylinder.

The primary object of the present invention is to provide an improved design and method of fabrication for such fluted crimping rolls to provide a sturdy and inexpensive roll that is relatively simple to manufacture and utilizes readily available material.

A more specific object is to fabricate such rolls by forming a pair of semi-cylindrical, longitudinally corrugated outer shell members from readily available metal sheet stock, and welding said shell members around the opposite sides of a cylindrical core, and further to fabricate the cylindrical core by welding a pair of annular plates with axial shaft stubs to the opposite ends of a cylindrical tube.

Still another object is to provide such a roll, which is of rugged construction and not easily damaged, but nevertheless is relatively light in weight.

These and other objects will become apparent from the following detailed description and accompanying drawings wherein.

Figure 1:
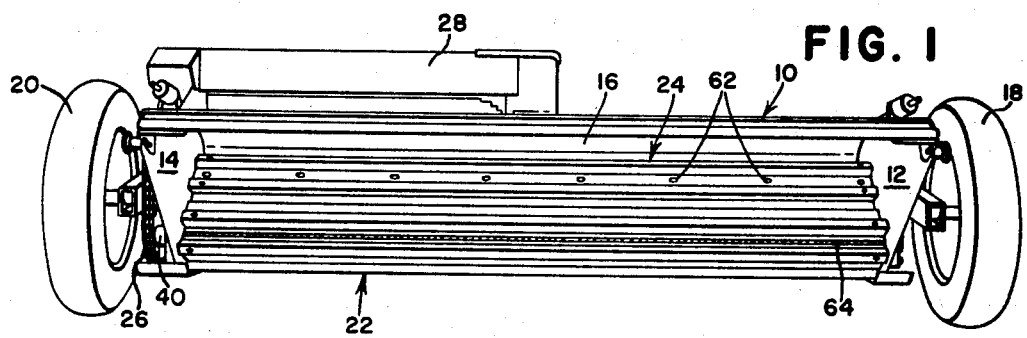
FIG. 1 is a rear perspective view of a typical crop conditioner having a pair of the improved rolls.
Figure 2:
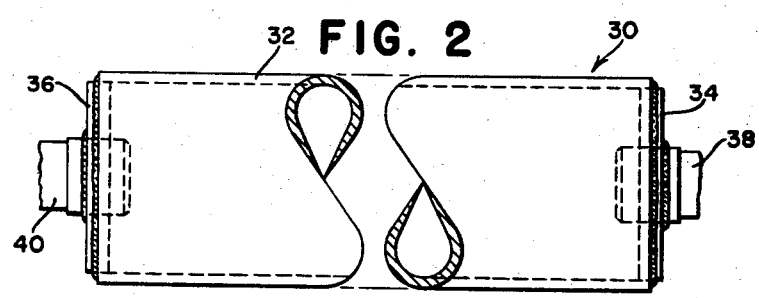
FIG. 2 is a partial plan view of the core of one of the rolls, with the central or intermediate portion of the core omitted.

The improved crimping roll is embodied in a crop conditioner which is shown in FIG. 1, the crop conditioner being of conventional construction and including a main frame 10, having opposite side panels 12 and 14 at opposite ends of a transversely elongated housing 16, open toward the front, bottom, and rear. The frame 10 is mounted on right- and left-hand wheels 18 and 20 respectively for advance over a field of previously harvested crops, such as hay or the like, which are lying on the stubble in swaths or windrows following the cutting operation. The illustrated crop conditioner is conventionally towed and powered by an agricultural tractor (not shown).

A pair of the novel crimping rolls are transversely carried by the frame 10 in a meshing relationship, the rolls being journaled at opposite ends on the sides 12 and 14. The rolls 22 and 24 are driven in opposite directions by a chain drive 26, which, in turn, is connected to and driven by the tractor power take-off mechanism (not shown) via a shielded power train 28. The roll 22 is spaced below and rearwardly of the upper roll 24, relative to the direction of machine travel, the lower roll 22 being rotated in a counterclockwise direction when viewed from the right-hand side of the machine (from the right in FIG. 1). The lower roll 22 picks the crop from the stubble and moves it upwardly and rearwardly between the cooperating rolls, whereby the crop is crushed or cracked and discharged rearwardly, the crop being returned to the field for subsequent pickup by a baler or the like.

While both the rolls 22 and 24 are constructed according to the invention herein, only a single roll with the novel construction could be utilized. Moreover, the novel roll construction could also be used on other types of crop conditioners, such as conditioner attachments for windrowers or the like, or even on other types of agricultural implements. It is also to be understood that the use of such words as "upwardly," "downwardly," "forwardly," "rearwardly," etc. are not to be construed as limiting the scope of the invention.

The construction of the roll 22 is shown in FIGS. 2–5. The roll 22 includes an elongated, generally cylindrical core 30, formed by an elongated tubular member 32, a pair of annular plates 34 and 36 respectively and coaxially attached to the opposite ends of the tubular member 32, and a pair of shaft stubs 38 and 40 respectively mounted in the annular plates 34 and 36 coaxially with the tubular member 32 and the annular plates 34 and 36. The shaft stubs 38 and 40 are respectively journaled in the side panels 12 and 14 in the illustrated crop conditioner, the left-hand shaft stub 40 being connected to the drive 26. The core 30 is preferably fabricated by first coaxially positioning the shaft stubs 38 and 40 within their respective plates 34 and 36 and welding them thereto, and then positioning the plates 34 and 36 within the opposite ends of the tubular member 32 and welding them thereto, the outside diameter of the annular plates 34 and 36 being substantially the same as the inside diameter of the tubular member 32.

The fluted configuration of the roll is provided by a sleeve-like, longitudinally corrugated outer shell, indicated in its entirety by the numeral 42, the outer shell being coaxially and coextensively attached to the core 30 and being formed by a pair of generally semi-cylindrical identical shell members 44 coaxially attached to opposite sides of the core 30.

Figures 3, 4:
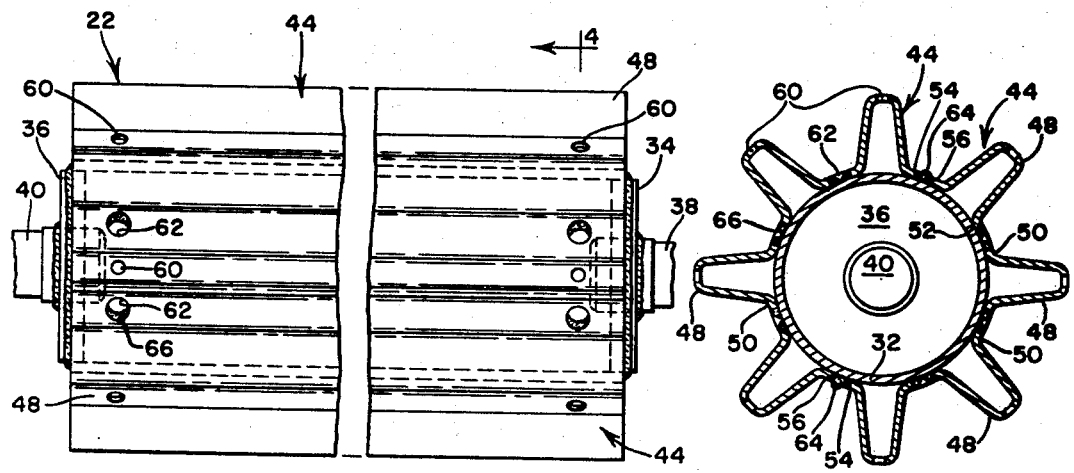
FIG. 3 is a partial plan view of the assembled conditioner roll with the intermediate or central portion of the roll omitted.
FIG. 4 is a section viewed along the line 4—4 of FIG. 3.
Figure 5:
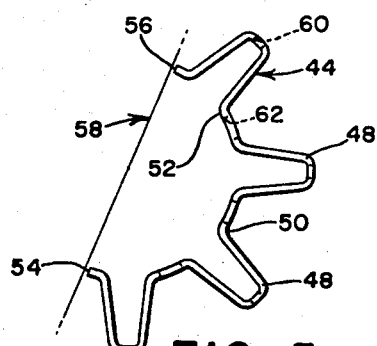
FIG. 5 is an end view of one of the outer shell members utilized in the construction of the roll.

The longitudinal corrugations in the members 44 are formed by equally spaced longitudinally extending ridges or teeth 48 and longitudinally extending hollows or recesses 50 between the ridges 48. The inside surface 52 of the bottom of each recess is concave toward the axis of the shell member, and has substantially the same radius of curvature as the exterior of the core 30, the inside surface 52 seating against the outer periphery of the core, as best seen in FIG. 4. The shell members 44 have generally diametrally opposed longitudinal terminal edges 54 and 56, extending longitudinally along the bottom of a recess 50. As shown in FIG. 5, the terminal edges 54 and 56 are spaced a short distance from the diametral plane, indicated by the numeral 58, to provide a small clearance between the edges 54 and 56 of the shell members when they are positioned on the core 30. When the shell members 44 are coaxially secured to the opposite sides of the core 30, as shown in FIG. 4, all of the ridges or teeth 48 are equally spaced angularly, the illustrated embodiment having eight ridges or teeth 48 at 45° angular intervals around the periphery of the roll.

The shell members 44 are preferably formed from readily available steel sheet stock, one-eighth inch steel stock being satisfactory for the hay conditioning application of the roll. The shell members are produced by forming the longitudinal corrugations in the sheet stock and subsequently or simultaneously forming the proper radius of curvature. A gauge hole 60 is provided through the crown of each ridge or tooth 48 adjacent the opposite ends of the shell member to control the location of the member during the forming operation. A plurality of axially spaced access holes are also provided through the bottom of each recess 50.

The shell members are preferably fastened to each other and to the core 30 by welding, as best seen in FIG. 4, a pair of butt welds 64 being made along the length of the roll in the small clearance between the approximately abutting longitudinal terminal edges 54 and 56, securing the longitudinal terminal edges to each other and to the core 30. A plug weld 66 is made at each access opening or hole 62 to further secure the shell members to the core.

The above construction provides a crimping roll that is relatively light in weight, but nevertheless sufficiently strong and durable for the function of the machine. The use of readily available materials and the small amount of machining inherent in the roll construction, also provide a roll that is relatively simple and inexpensive to manufacture. In addition, the use of identical shell members or shell halves 44 reduces the tooling necessary for the forming operation. While two semi-cylindrical shell members are utilized in the illustrated embodiment, it is to be understood that different cylindrical sections could be utilized, although it is preferable that the cylindrical sections be identical to reduce the tooling necessary for their fabrication.

Other features and advantages of the invention will readily occur to those skilled in the art, as will many modifications and alterations in the preferred embodiment of the invention described herein, all of which may be achieved without departing from the spirit and the scope of the invention.

What is claimed is:

1. A crimper roll for an agricultural crop treating machine comprising: an elongated cylindrical core; and a plurality of elongated, generally longitudinally corrugated outer shell members, each shell member being concavo-convex about a longitudinal axis and having generally longitudinally extending ridges and recesses therebetween, the concave side of said members being formed by the bottom of said recesses, and having substantially the same radius of curvature as said core, each shell member having opposite longitudinal terminal edges formed along the bottom of different recesses, the shell members being coaxially and longitudinally coextensively rigidly affixed to the core in a side-by-side edge abutting relationship, so that the shell members conjunctively encircle the core.

2. The invention defined in claim 1 wherein the shell members are identical and generally semi-cylindrical, a pair of said members being affixed to the core with their longitudinal terminal edges diametrally opposite one another.

3. The invention defined in claim 2 wherein the core includes a hollow tubular member, a pair of annular members having axial bores and coaxially attached to the opposite ends of the tubular member, and an axial shaft means coaxially mounted in said bore and projecting beyond the opposite ends of said tubular member.

References Cited

UNITED STATES PATENTS

| | | | |
|---|---|---|---|
| 1,309,059 | 7/1919 | Bacon. | |
| 2,075,448 | 3/1937 | Lundquist et al. | 130—5 |
| 2,263,440 | 11/1941 | Hansen | 29—121 |
| 2,285,375 | 6/1942 | Hansen | 29—121 |
| 2,352,501 | 6/1944 | Slavicek | 29—148.4 |
| 2,538,965 | 1/1951 | Fergason | 29—121 XR |
| 3,284,875 | 11/1966 | Wood | 29—121 |
| 73,467 | 1/1868 | Seely | 29—121 |
| 1,410,546 | 3/1922 | Battey. | |
| 1,840,049 | 1/1932 | Mitchell | 29—121 |
| 3,101,720 | 8/1963 | Karlsson | 29—121 XR |

BILLY J. WILHITE, *Primary Examiner.*